A. W. HELSING & H. A. DONALDSON.
NUT LOCK.
APPLICATION FILED DEC. 16, 1910.
1,020,421.
Patented Mar. 19, 1912.
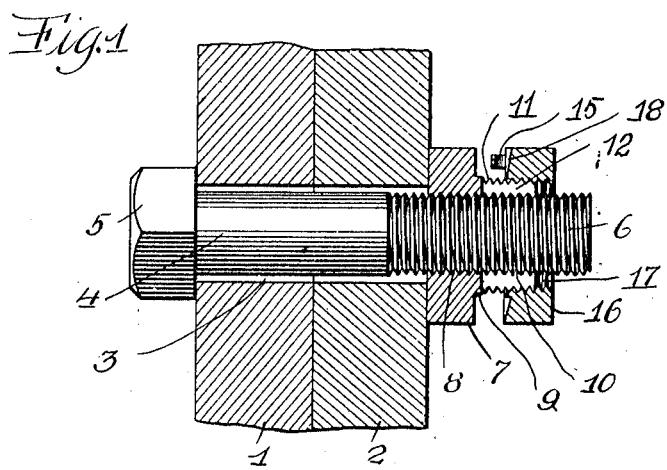
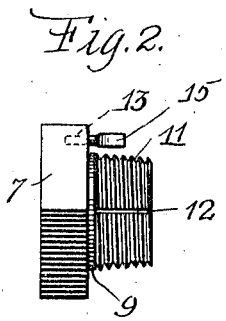
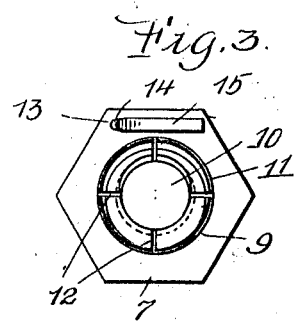
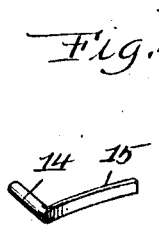
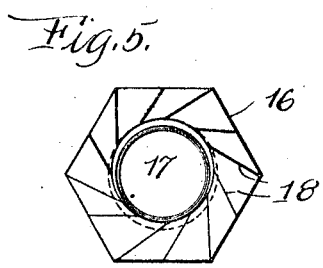
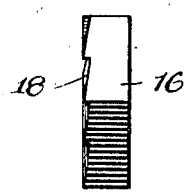
WITNESSES
INVENTORS
A. W. Helsing and H. A. Donaldson
by
Attorneys.

UNITED STATES PATENT OFFICE.

AUGUST W. HELSING AND HARRY A. DONALDSON, OF FAIR OAKS, PENNSYLVANIA.

NUT-LOCK.

1,020,421.

Specification of Letters Patent. Patented Mar. 19, 1912.

Application filed December 16, 1910. Serial No. 597,652.

*To all whom it may concern:*

Be it known that we, AUGUST W. HELSING and HARRY A. DONALDSON, citizens of the United States of America, residing at Fair Oaks, in the county of Allegheny and State of Pennsylvania, have invented certain new and useful Improvements in Nut-Locks, of which the following is a specification, reference being had therein to the accompanying drawing.

This invention relates to nut locks, and the objects of the invention are to provide a nut with positive and reliable means in a manner as will be hereinafter set forth whereby the nut when screwed upon a bolt cannot become accidentally displaced, and to provide a nut lock that can be advantageously used in connection with rail joints, bridges, rolling stock and structures subjected to vibrations that have a tendency to loosen nuts upon bolts.

Other objects of the invention are to provide a nut lock that can be easily installed in connection with a rail joint without the use of skilled labor, and to provide a double lock for a nut upon a bolt.

These and such other objects as may hereinafter appear are attained by a mechanical construction that will be presently described in detail and then claimed, and reference will now be had to the drawing, wherein:—

Figure 1 is a longitudinal sectional view of the nut lock, Fig. 2 is a side elevation of the main nut, Fig. 3 is a front elevation of the same. Fig. 4 is a perspective view of a detached resilient locking member adapted to form part of the nut lock, Fig. 5 is a rear elevation of a detached auxiliary nut, and Fig. 6 is a side elevation of the same.

In the drawing the reference numerals 1 and 2 denote, by the way of an example, two pieces of material provided with registering openings 3 adapted to receive a bolt 4 having a head 5 to engage the piece of material 1, the opposite end of the bolt being screw threaded, as at 6 and protruding from the piece of material 2.

7 denotes a nut screwed upon the bolt 4 to engage the outer face of the piece of material 2, the nut 7 having an opening 8 with the walls thereof threaded to receive the threaded end 6 of the bolt 4. The outer face of the nut is provided with an integral tapering sleeve 9 having a bore 10 registering with the opening 8 of the nut 7, said bore having the walls thereof screw threaded as a continuation of the threads of the opening 8. The sleeve 9 is exteriorly screw threaded, as at 11 and is provided with a plurality of longitudinal slits or slots 12 whereby the material between said slits or slots can be contracted to frictionally grip the threaded end 6 of the bolt 4. The outer face of the nut 7 is provided with a socket 13 and loosely mounted in said socket is the shank 14 of a resilient flat locking member 15. As shown in Fig. 4, the shank 14 is circular in cross section so that with the loose mounting thereof, the member 15 may be moved pivotally in the socket.

16 denotes an auxiliary nut having an opening 17 with the walls thereof threaded whereby it can be screwed upon the tapering sleeve 9 of the main nut 7 to contract the split parts of said sleeve. The inner face of the nut 16 has a plurality of tangentially disposed ratchet teeth 18 and these teeth are adapted to be engaged by the resilient flat locking member 15 to prevent a rearward rotation of the auxiliary nut 16 after it has been screwed upon the sleeve 9.

The nut lock can be removed without injuring the bolt 4 or the nuts by inserting a suitable instrument between the inner face of the auxiliary nut 16 and the locking member 15 to pry said device out of engagement with the tangentially disposed ratchet teeth 18, thus moving the member pivotally and releasing the tongue without placing material pressure on the spring in the direction in which it exerts pressure, and as said locking device is held out of engagement with the auxiliary nut, said nut can be loosened with a wrench or other instrument, and then the main nut 7 removed from the bolt.

It is thought that the operation and utility of the nut lock will be apparent without further description, and while in the drawing there is illustrated a preferred embodiment of the invention, it is to be understood that the structural elements thereof are susceptible to such changes as fall within the scope of the appended claim.

What we claim is:—

In a nut lock a threaded bolt, a nut adapted to be threaded thereon and having an extension externally threaded and split longitudinally, a locking member pivotally mounted in said nut and having a laterally-extending spring tongue, and an auxiliary nut adapted to be threaded on said extension and having teeth adapted to be engaged by said tongue to lock the nut, said nuts being disengaged by rocking the tongue on its pivot.

In testimony whereof we affix our signatures in the presence of two witnesses.

AUGUST W. HELSING.
HARRY A. DONALDSON.

Witnesses:
MAX H. SROLOVITZ,
CHRISTINA T. HOOD.